US009476528B2

(12) United States Patent
Tiberghien et al.

(10) Patent No.: US 9,476,528 B2
(45) Date of Patent: Oct. 25, 2016

(54) FLUID COUPLING ELEMENT AND CORRESPONDING ASSEMBLY

(71) Applicant: STAUBLI FAVERGES, Faverges (FR)

(72) Inventors: Alain-Christophe Tiberghien, Sevrier (FR); Christophe Durieux, Gilly sur Isere (FR); Serafim Marques Barroca, Frontenex (FR)

(73) Assignee: STAUBLI FAVERGES, Faverges (FR)

( * ) Notice: Subject to any disclaimer, the term of this patent is extended or adjusted under 35 U.S.C. 154(b) by 0 days.

(21) Appl. No.: 13/914,816

(22) Filed: Jun. 11, 2013

(65) Prior Publication Data

US 2013/0334814 A1    Dec. 19, 2013

(30) Foreign Application Priority Data

Jun. 15, 2012    (FR) ...................... 12 55596

(51) Int. Cl.
*F16L 37/23*    (2006.01)
*F16L 21/08*    (2006.01)

(52) U.S. Cl.
CPC ................ *F16L 21/08* (2013.01); *F16L 37/23* (2013.01)

(58) Field of Classification Search
CPC ...................................... F16L 37/23
USPC ................. 285/276, 277, 314–316
See application file for complete search history.

(56) References Cited

U.S. PATENT DOCUMENTS 2,473,973 A * 6/1949 Scheiwer ...................... 285/277
2010/0019493 A1   1/2010 Kitagawa

FOREIGN PATENT DOCUMENTS

| DE | 3023377 A1 | 1/1982 |
| EP | 2088360 A1 | 8/2009 |
| EP | 2103859 A1 * | 9/2009 |

* cited by examiner

*Primary Examiner* — David E Bochna
*Assistant Examiner* — James Linford
(74) *Attorney, Agent, or Firm* — Dowell & Dowell, PC

(57) ABSTRACT

A fluid coupling element including a base body having a central axis (X-X) in which a complementary fluid coupling element is selectively received, and wherein a locking ring includes a locking ball that is capable of locking the complementary fluid coupling element relative to the base body locking ball is movable radially in the body between a locking position of the complementary fluid coupling element and an unlocking position and wherein an actuating ball of the locking ring is adapted to be pushed into an elongated housing of the base body by the complementary fluid coupling element so as to move the locking ring axially from a locking position, wherein the locking ball is locked in the locking position, to a release position and a spring for returning the locking ring to the locking position and wherein the actuating ball has a diameter greater than a diameter of the locking ball.

15 Claims, 8 Drawing Sheets

FLUID COUPLING ELEMENT AND CORRESPONDING ASSEMBLY

BACKGROUND OF THE INVENTION

1. Field of the Invention

The present invention relates to a fluid coupling element, of the type comprising: a base body defining a central axis (X-X) of fit of an complementary fluid coupling element, a locking ring, movable relative to the base body, at least one locking ball that is capable of locking the complementary fluid coupling element relative to the base body, the or each locking ball being radially movable in the body between a locking position, wherein the locking ball is adapted to lock the complementary fluid coupling element, and an unlocking position wherein the locking ball frees the passage for the complementary fluid coupling element, at least one actuating ball of the locking ring adapted to be pushed into an elongated housing of the base body by the complementary fluid coupling element during the coupling of the coupling element and the complementary coupling element, so as to move the locking ring axially from a locking position, wherein the or each locking ball is locked in said locking position, at least into a release position in which the or each locking ball is free to move in said unlocking position for unlocking the means for returning the locking ring to said locking position.

It applies in particular to fluid couplings in the chemical or food industry.

2. Brief Discussion of the Related Art

A coupling assembly comprising such a coupling element is known from DE3023377. This document discloses a coupling with actuating ball (in the lower portion of FIGS. 1 and 2 of this document) accommodated in an elongated housing. Said balls pushed by the complementary coupling element I move the locking ring in such a way that the locking balls (in the upper portion of FIGS. 1 and 2 of this document) are able to engage in the element I for the locking thereof. It is clear that all the balls have the same diameter.

Another coupling assembly is known from the document EP2088360, which discloses a coupling in which the locking ball is also involved in the movement of the locking ring to the coupling and in which the angle α of the surface of the complementary coupling element 32a in contact with the actuating ball is greater than the angle β of the inclined surface 50a of the lock ring in contact with the actuating ball when the actuating ball moves the locking ring.

In both documents of the state of the art, given the low radial overruns of the actuating ball, of the same diameter as the locking ball, on each side of the body, and on account of the radial clearances of operation, it is not possible to ensure that the actuating ball is bearing against the conical surface as in 32a in EP2088360 and against the conical surface of the type 50a (in EP2088360) rather than on the fillets of these surfaces. Therefore it is not possible to ensure, despite α>β, that the actuating ball remains in engagement between the locking ring and the complementary coupling element without being driven radially outward during the recoil of the locking ring for the coupling.

Moreover, because of operating clearances and manufacturing tolerances, it is not excluded in DE3023377 that the locking ball has to actuate the locking ring for coupling, which would lead to very significant connection loads.

SUMMARY OF THE INVENTION

The invention aims to resolve at least one of these drawbacks and to provide a coupling element that allows for reliable coupling, and this preferably with economical means.

To this end, the invention relates to an element as defined above, characterised in that the or each actuating ball has a diameter ($D$) greater than the diameter ($d$) of the or each locking ball.

According to the embodiments, the element according to the invention comprises one or more of the following characteristic features:

- the diameter ($D$) of the or each actuating ball is between 105% and 125% of the diameter ($d$) of the or each locking ball;
- when the locking ring is in said locking position in the uncoupled state of the coupling, the or each actuating ball protrudes from the base body radially from both the sides by a substantially identical distance;
- a rear end of the elongated housing has a slope forming an angle ($\gamma$) of between 105° and 130° relative to the central axis (X-X);
- during the coupling, the forward most position of the locking ring wherein the or each locking ball is free to move radially in said unlocking position is located axially between said locking position and a position of the locking ring, wherein the or each actuating ball enters into contact with a rear end of the elongated housing;
- when the locking ring is in said locking position in the uncoupled state of the coupling, the locking ring is pushed against the or each actuating ball and the or each actuating ball is in contact with a front end of the elongated housing;
- the outer surface of the base body on which said elongated housing is arranged is a surface of revolution about the central axis (X-X) and the inner surface of the locking ring is a surface of revolution about the central axis (X-X); and
- the fluid coupling element comprises at least three actuating balls.

The invention also relates to a fluid coupling assembly comprising a fluid coupling element and an complementary fluid coupling element, characterised in that the fluid coupling element is an element as described here above.

According to the embodiments, the assembly may include one or more of the following characteristic features:

- the complementary fluid coupling element comprises an actuating collar for actuation of the or each actuating ball for moving the locking ring from said locking position to at least said release position during the coupling and a groove adapted to receive the or each locking ball in said locking position in the coupled state of the coupling assembly;
- the collar has a first slope of actuation inclined at an first angle ($\alpha$) relative to the central axis, the locking ring has a second slope of actuation, the second slope of actuation being inclined at a second angle ($\beta$) relative to the central axis, the or each actuating ball is engaged between the first slope of actuation of the complementary coupling element and the second slope of actuation of the locking ring for the displacement of the locking ring from said locking position to at least the said release position during the coupling and in that the first angle ($\alpha$) is greater than the second angle ($\beta$);
- during the coupling, when the or each actuating ball enters into contact with a top of said collar, the or each locking ball is in contact with the top or radially facing the said groove, during the coupling, when the or each actuating ball enters into contact with a rear end of the elongated housing, the or each locking ball projects radially over the exterior of the base body;

the fluid coupling element includes a sealing gasket and the complementary fluid coupling element includes a sealing surface adapted to cooperate with said sealing gasket in the coupled state of the coupling assembly, the or each locking ball and/or actuating ball is capable of occupying a radially inner most position, and in said radially innermost position, the locking ball and/or actuating ball is situated radially away from an exterior diameter (DE) of said sealing surface; and in the locking position of the locking ball in said locking position in the coupled state of the coupling assembly, the locking ring is resiliently pressed against the actuating ball and actuating ball is not in contact with the complementary fluid coupling element.

BRIEF DESCRIPTION OF THE DRAWINGS

The invention will be better understood upon reading the description which follows, given only by way of example and with reference being made to the accompanying drawings, in which.

DESCRIPTION OF THE PREFERRED EMBODIMENTS

Figure 1:
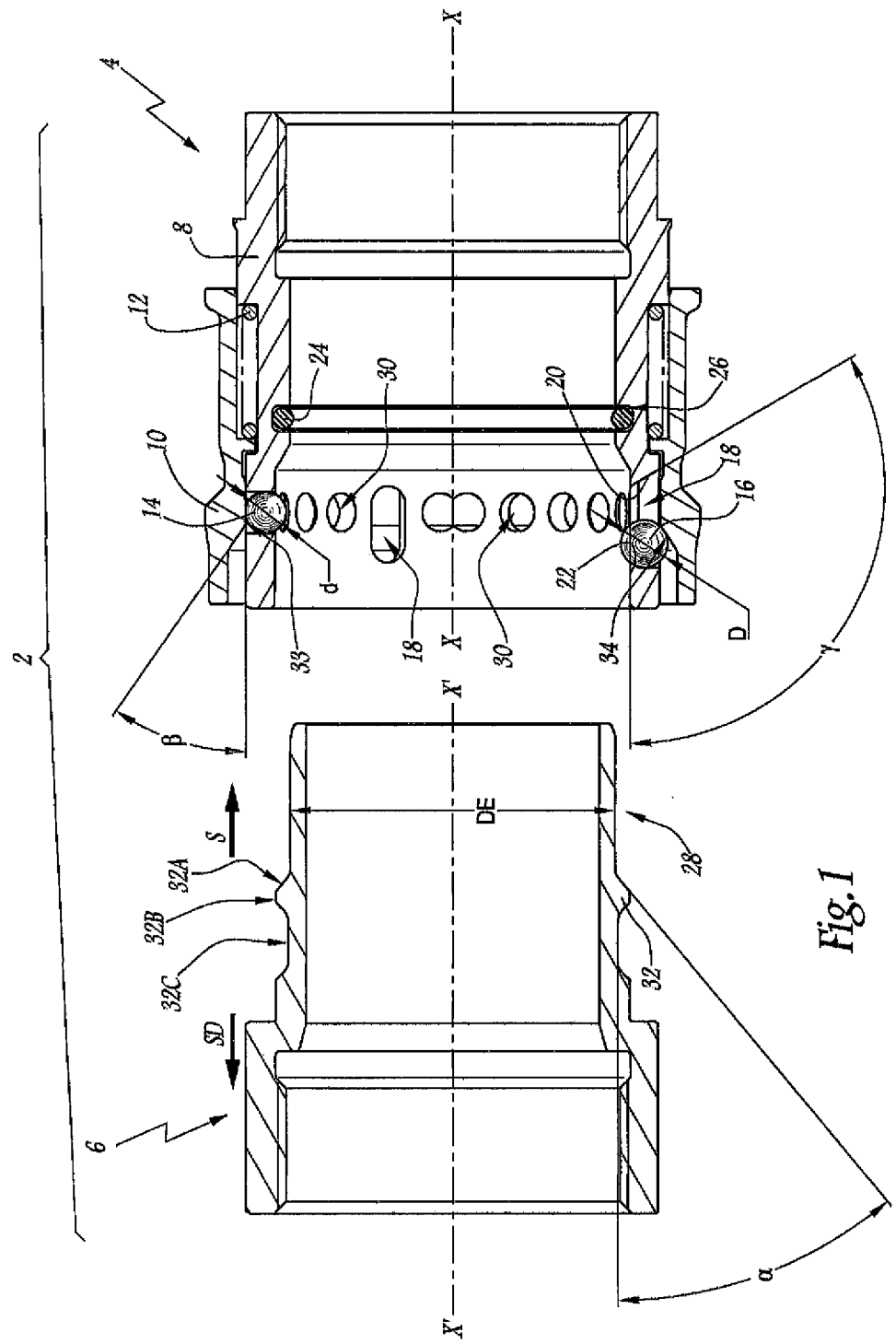
FIG. 1 shows an axial cross sectional split view of the assembly according to the invention in the uncoupled state.

In FIG. 1 is shown a fluid coupling assembly according to the invention, designated by the general reference 2.

The fluid coupling assembly 2 comprises a fluid coupling element 4 and complementary fluid coupling element 6.

The fluid coupling element 4 comprises a base body 8 of revolution about a central axis X-X of fit with the complementary fluid coupling element 6, a locking ring 10 and a spring 12. In the sections that follow, the terms "axial" and "radial" shall be used in relation to this axis X-X.

The terms "front" and "rear" shall be used thereafter in relation to the fluid coupling element 4 or the complementary fluid coupling element 6 with which the object referred to as "front" or "rear" is associated. "Front" denotes the axial side of either one of the fluid coupling element 4 and the complementary fluid coupling element 6 facing towards the other one of the fluid coupling element 4 and the complementary fluid coupling element 6. "Rear" denotes the axial side of either one of the fluid coupling elements 4 and the complementary fluid coupling element 6 facing away from the other one of the fluid coupling element 4 and the complementary fluid coupling element 6. Thus, the "front" side of the fluid coupling element 4 is located to the left in FIG. 1 and the "rear" side of the fluid coupling element 4 is located on the right in FIG. 1. The "front" and "rear" sides of the complementary fluid coupling element 6 are located on opposite sides.

Each fluid coupling element 4 and complementary fluid coupling element 6 defines an "interior" side and an "exterior" side, the interior side being located radially closer to the central axis than the "exterior" side.

The fluid coupling assembly 2 defines a direction of coupling S directed along the direction of introduction of the complementary fluid coupling element 6 into the fluid coupling element 4. The fluid coupling assembly 2 defines a direction of uncoupling SD directed along the direction of exit of the complementary fluid coupling element 6 out of the fluid coupling element 4.

The rear of the base body 8 is connected to a fluid conduit not shown.

The fluid coupling element 4 is in addition provided with a plurality of locking members 14 capable of locking the complementary fluid coupling element 6 in relation to the base body 8 when they are in their locking position.

The locking ring 10 is a revolving piece that surrounds the base body 8 and is movable relative to the base body 8 between different axial positions.

Figure 4:
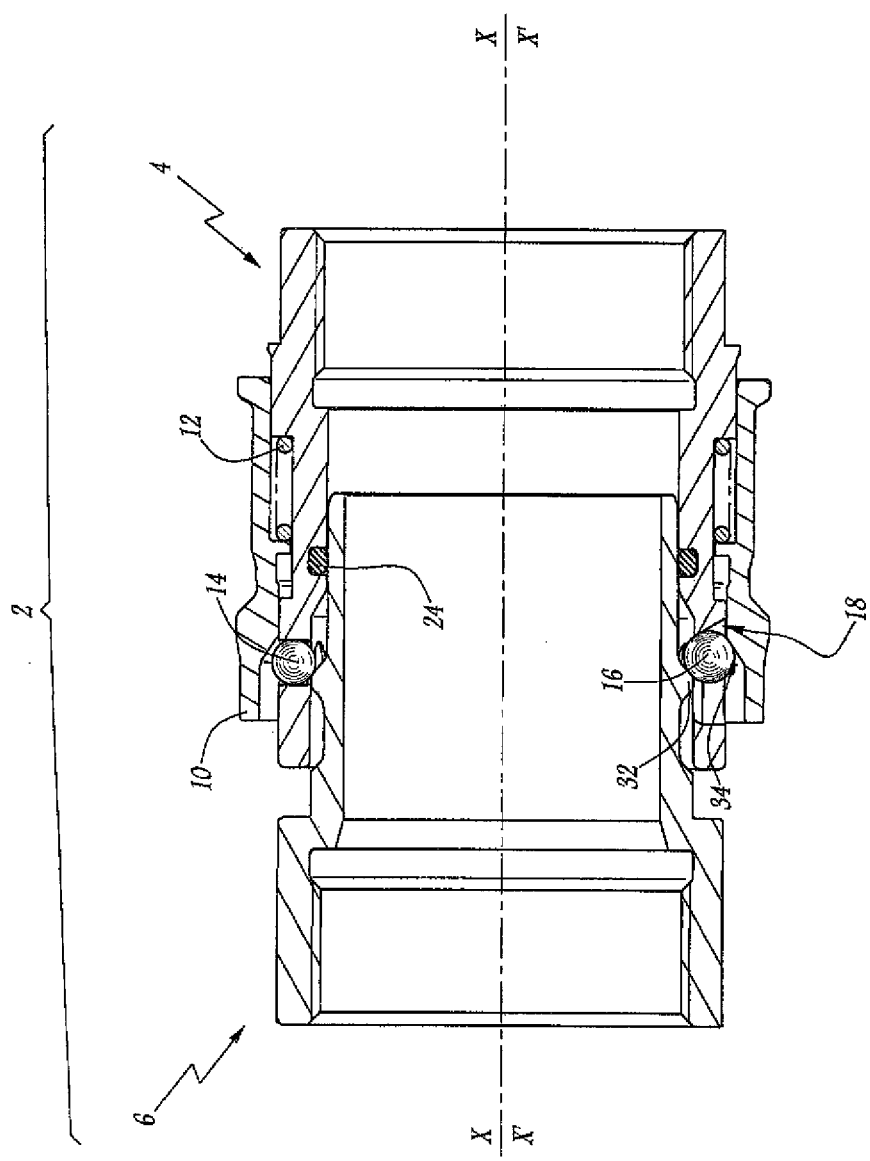
FIG. 4 shows a view similar to that of FIG. 1, during the coupling in the configuration in which the actuating member enters in contact with one end of the housing.

These positions are in particular, at least one position of locking of the locking members (FIGS. 1 and 2) in which the locking ring 10 is pushed by the spring 12, a position of release of the locking members 14, and a contact position (FIG. 4). In the so called locking position of the ring, the locking members 14 are locked radially by the locking ring 10 in their locking position.

The position of the locking ring 10 that is called the release position corresponds to the forward most position of the locking ring 10 in which the locking members 14 are free to move radially in their unlocking position. In their locking position with the locking ring in the locking position, the locking members 14 protrude inwards relative to the body 8 and they oppose, when the connector is coupled, the retraction from the coupling element 4 of the complementary coupling element 6 or, when the connector is not coupled, the fit thereof into the coupling element 4 of the complementary coupling element 6. In their unlocking position, radially outwardly relative to their position of locking with the balls 14 which protrude outwardly from the body 8, the locking members 14 no longer protrude inwards relative to the body 8 and free the passage for the complementary coupling element 6 in the coupling element 4. They then do not oppose the retraction from the coupling element 4 or the fit thereof into the coupling element 4 of the complementary coupling element 6.

The fluid coupling element 4 also comprises at least one, and in particular at least three, actuating members(s) 16 for actuation of the locking collar 10 capable of pushing the locking ring from its locking position at least into its release position.

In this case, each actuating member 16 is a revolving member and in particular a ball. Similarly, each locking member 14 is a revolving member and in particular a ball. The or each actuating member 16 has a diameter $\underline{D}$ greater than the diameter $\underline{d}$ of the or each locking member 14, each diameter corresponding to the dimension of the member considered radially to the axis X-X.

Preferably, all actuating members 16 have the same diameter. Preferably, all the locking members 14 have the same diameter.

Moreover, the diameter $\underline{D}$ of the or each actuating member 16 is between 105% and 125% of the diameter $\underline{d}$ of the or each locking member 14.

In the contact position of the locking ring 10, the actuating members 16 enter into contact with a rear end 20 of the elongated housing 18 (see here below).

Figure 2:
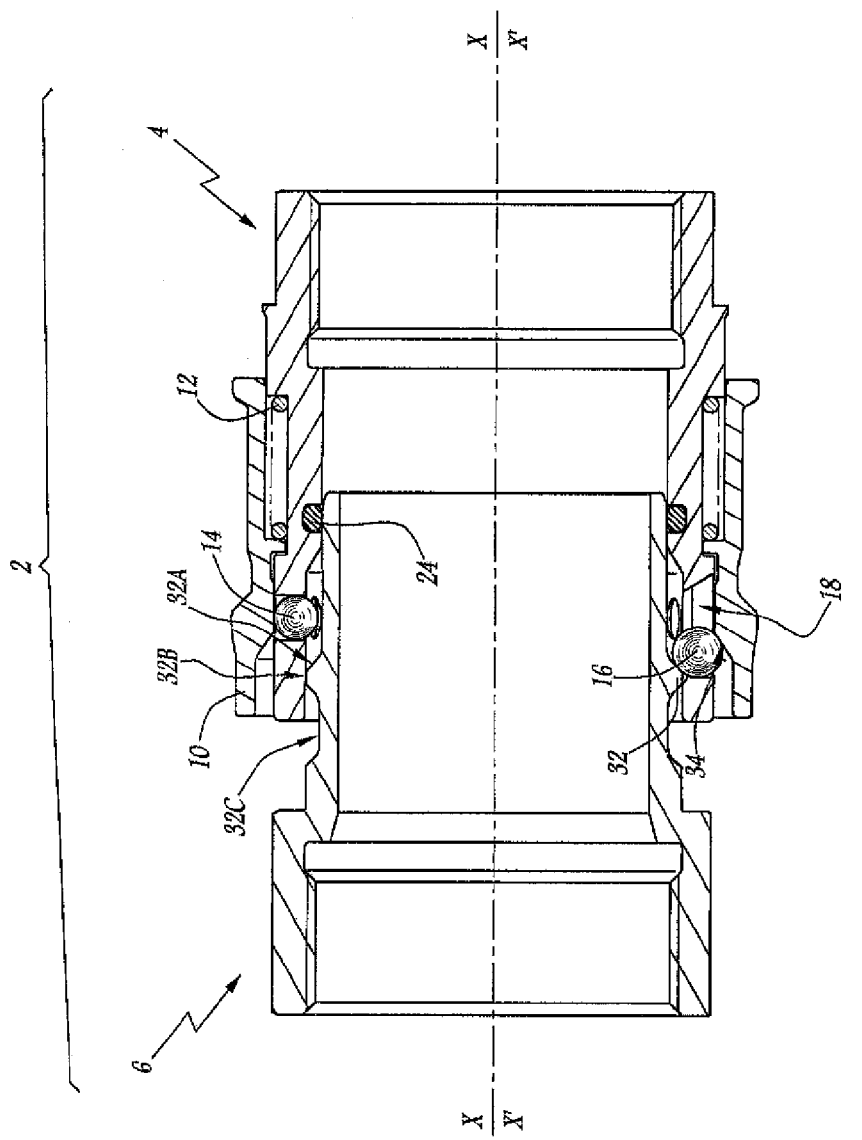
FIG. 2 shows a view similar to that of FIG. 1, during the coupling in the configuration in which the complementary coupling element comes into contact with the actuating member.

The base body 8 includes, for each actuating member 16 an elongated housing 18 extending in parallel to the central axis X-X, opening out on both sides of the base body 8 and whose width, perpendicular to the plane of FIGS. 1 and 2 substantially corresponds to the transverse dimension of the actuating member 16. Each elongated housing 18 has a rear end 20 and a front end 22. The associated actuating member 16 is pushed against the rear end 20 during the coupling. The rear end 20 has a slope forming an angle γ between 105° and 130° relative to the central axis X-X and widening towards the rear of the coupling 4.

Advantageously, when the locking ring 10 is in an end position corresponding to the locking position of the balls 14 in the uncoupled state of the assembly 2, the or each actuating member 16 protrudes from the base body 8 on both sides by an identical radial distance, a distance that is substantially equal to the inside radial protrusion of the locking ball relative to the base body 8.

The release position of the locking ring is situated axially between the locking position of the locking ring in the uncoupled state and the contact position of the locking ring.

In the end position and in the uncoupled state, the locking ring 10 is resiliently pushed by the spring 12 against each actuating member 16 and each actuating member 16 is in abutment against the front end 22. In this position, the locking ring 10 is in contact with each actuating member 16.

The complementary fluid coupling element 6 is a piece that revolves around a central axis X'-X'. The central axis X'-X' coincides with the central axis X-X during fitment of the complementary coupling element 6 with the coupling element 4. The complementary coupling element 6 is connected to the rear of a pipe not shown, and comprises an actuating collar 32 adapted to be applied against the or each actuating member 16. The actuating collar 32 includes a slope of actuation 32A, oriented towards the front of the element 6. The slope of actuation 32A is inclined at an angle α of 25° to 50°, in this case 40°, in relation to the central axis X'-X' and flares towards the rear of the complementary coupling element 6. The actuating collar 32 has a top 32B at the rear of and adjacent to the slope of actuation 32A. The element 6 further comprises a groove 32C provided at the rear of the actuating collar 32. The fluid coupling element 4 further comprises a sealing gasket 24 disposed in an inner groove 26 formed in the base body 8. The complementary fluid coupling element 6 further comprises a sealing surface 28 adapted to cooperate with the sealing gasket 24 in the coupled state. The sealing surface 28 has an outer diameter $\underline{DE}$.

Each actuating member 16 and the associated housing 18 define a radially inner most position of said actuating member 16 relative to the base body 8. In the radially inner most position, each actuating member 16 is situated radially away from an exterior diameter $\underline{DE}$ of the sealing surface 28 during coupling.

For each locking member 14, the base body 8 comprises a housing 30. The housing 30 in this case is mainly cylindrical with a circular section and guides the locking member 14 in its radial movement between its locking position and its unlocking position. The housing 30 is disposed rearwards in relation to the front end 22 of elongated housing 18 and forwards in relation to the rear end 22. The axial positions of the housings 18 and 30 thus overlap partially. Each locking member 14 and the associated housing 30 define a radially inner most position of this locking member 14 relative to the base body 8. In the radially inner most position, each locking member 14 is situated radially away from the exterior diameter $\underline{DE}$ of the sealing surface 28 during coupling.

The rear end 20 of the elongated housing 18 is disposed axially rearward relative to the housing 30.

The locking ring 10 has a covering surface 33 and a slope of actuation 34 against which the or each actuating member 16 is applied during coupling. The slope of actuation 34 being inclined at an angle β of 25° to 50°, in this case 35°, in relation to the central axis X-X and widening towards the front of the coupling element 4. The angle α is greater than the second angle β, preferably by at least 5°, preferably at most by 10°.

The fact that the diameter $\underline{D}$ of the actuating balls or actuating members 16 is greater by 5 to 25% than that of the locking balls or locking members 14, correspond for the locking balls of 7 mm diameter to the actuating balls of diameter between 7.5 and 8.5 mm.

In the uncoupled position (FIG. 1), the locking ring 10 is pushed in the locking position in abutment against the actuating balls or actuating members 16. The slope of actuation 34 then cooperates with the actuating balls 16. The locking balls 14 are radially locked in the locking position by the covering surface 33 and protrude radially inwards relative to the body 8.

The assembly according to the invention operates in the following manner during coupling. The explanations are provided for a locking ball and an actuating ball, the behaviour being analogous for the other locking balls/locking members 14 and the other actuating balls/actuating members 16.

The complementary coupling element 6 is inserted into the coupling element 4 by the operator in the direction S along the axis X-X. The collar 32 engages in the base body 8 with a reduced radial clearance and then the sealing surface 28 comes into contact with the sealing gasket 24, thus creating a sealing between the two coupling elements 4 and 6. The collar 32 comes into contact with the actuating ball 16. The actuating ball is then wedged in engagement between the complementary coupling element 6 and the locking ring 10 in the locking position, precisely between the slope of actuation 32A inclined at an angle α of the actuating collar 32 and the slope of actuation 34 of the actuating ring 10 inclined at an angle β. As a consequence, a force with a radial inwards resultant is applied to the actuating ball 16 and ensures its maintenance in continued engagement between the complementary coupling element 6 and the locking ring 10 when the complementary coupling element 6 axially pushes the actuating ball 16 in the elongated housing 18.

The axial movement of the actuating ball 16 axially drives the locking ring 10 against the spring 12.

Figure 3:
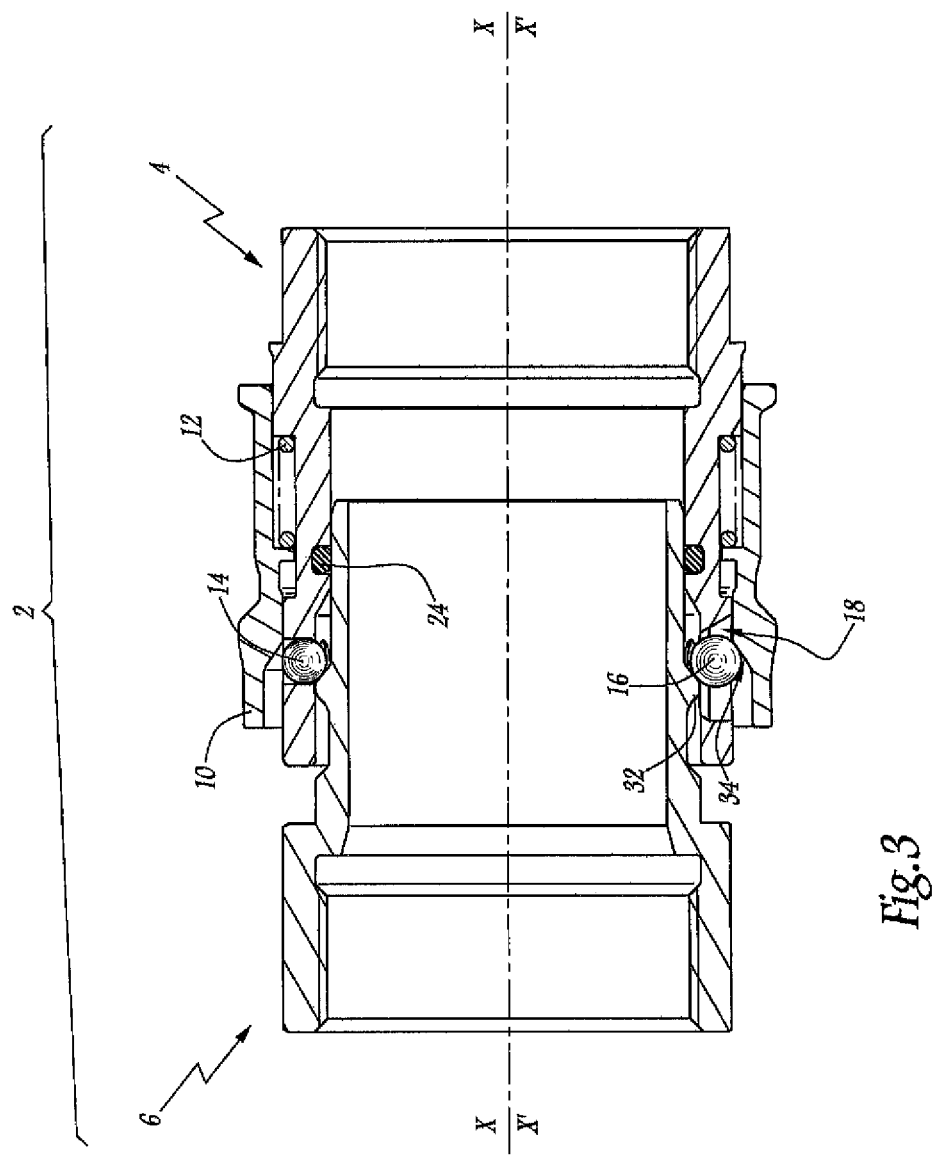
FIG. 3 shows a view similar to that of FIG. 1, during the coupling in the configuration in which the complementary coupling element comes into contact with the locking member.

When the slope of actuation 34 of the complementary coupling element 6 comes into contact with the locking ball 14, the centres of the locking ball 14 and the actuating ball 16 are substantially in the same axial position (FIG. 3). In this configuration, the locking ball has a radial clearance with the locking ring 10 and the actuating ball is not yet in contact with the rear end 20 of the elongated housing 18.

The progression of the complementary coupling element 6 into the coupling element 4 and thus that of the locking ring 10 is continued.

The locking ring 10 reaches its position of release (not shown) of the locking members 14, in which the locking members 14 have sufficient radial clearance with the locking ring 10 on the exterior of the body 8 in order to be movable in the unlocked position. The actuating ball 16 is not yet in contact with the rear end 20 of the elongated housing 18.

The progression of the complementary coupling element 6 into the coupling element 4 and thus that of the locking ring 10 is continued.

When the actuating ball 16 comes into contact with the rear end 20 of elongated housing 18 (FIG. 4), the path that has been traversed by the locking ring 10 is greater than its minimum displacement path necessary for release of the locking ball, which ensures that the locking ball does not have to act on the rearwards displacement of the locking ring 10. This leads to little or no manual efforts during the coupling.

In this configuration, where the locking ring 10 is in its so called contact position, the locking ball 14, pushed by the actuating collar 32 of the complementary coupling element 6 protrudes over the exterior of the base body 8 so that if the actuating ball 16 happens to lose contact with the slope of actuation 34, the locking ring 10, pushed forward by the spring 12 would not be able to be pushed into a position where it could lock the actuating ball 16 into the groove 32C behind the actuating collar 32 and where the locking ball 14 would not be in the locking position in the groove 32C of the complementary coupling element 6. This non locked configuration would not be visible by the operator and could put his safety at risk.

Figure 5:
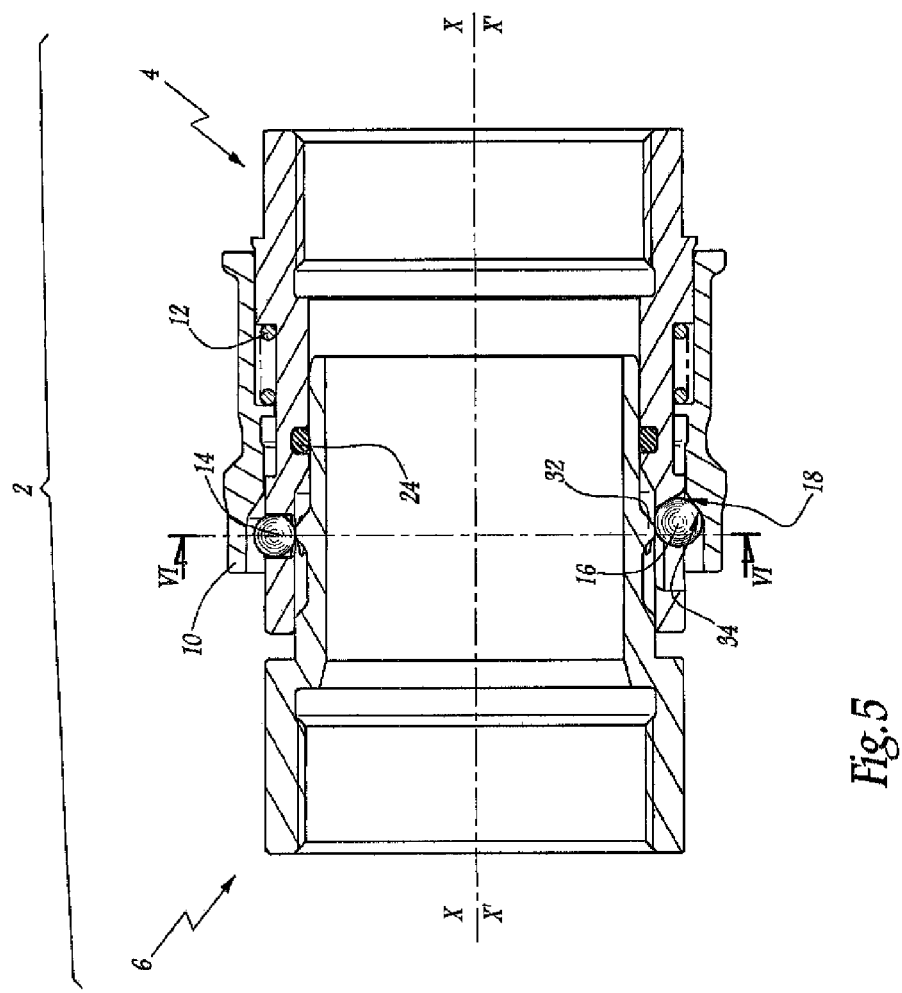
FIG. 5 shows a view similar to that of FIG. 1, during the coupling in the configuration in which the locking member is in the unlocking position.
Figure 6:
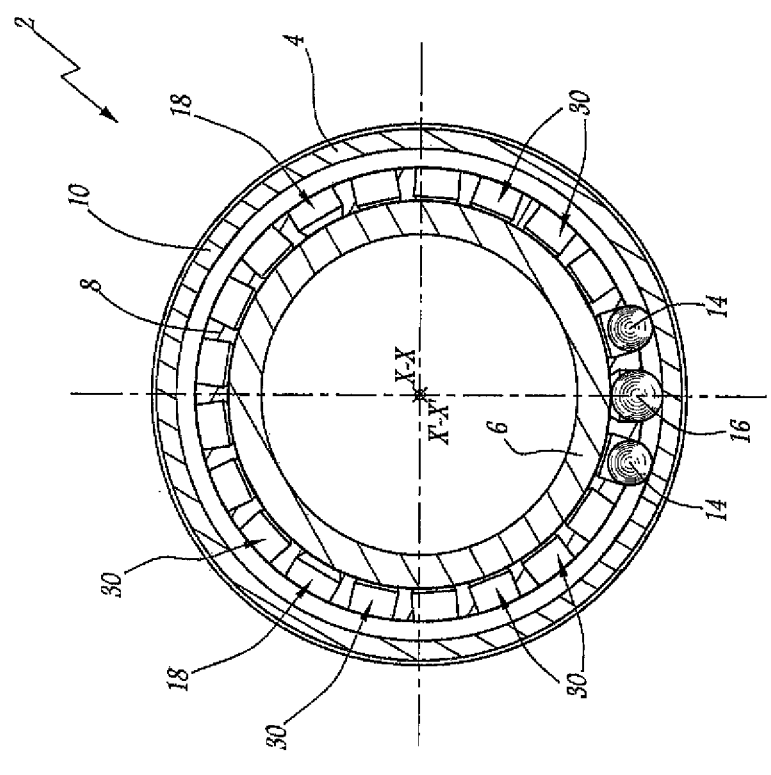
FIG. 6 shows a transverse cross sectional view along the line VI-VI of FIG. 5.

Then the actuating ball 16 is subsequently guided radially outwards by its cooperation with the slope of the rear end 20 of the elongated housing 18 ($\gamma=120°$) in the progression of the complementary coupling element 6 in the direction of coupling S, and this until the actuating ball passes radially over the top 32B of the actuating collar 32 of the complementary coupling element 6 (FIG. 5).

Simultaneously, the locking ring 10 continues to move against the spring 12, beyond the contact position.

Figure 7:
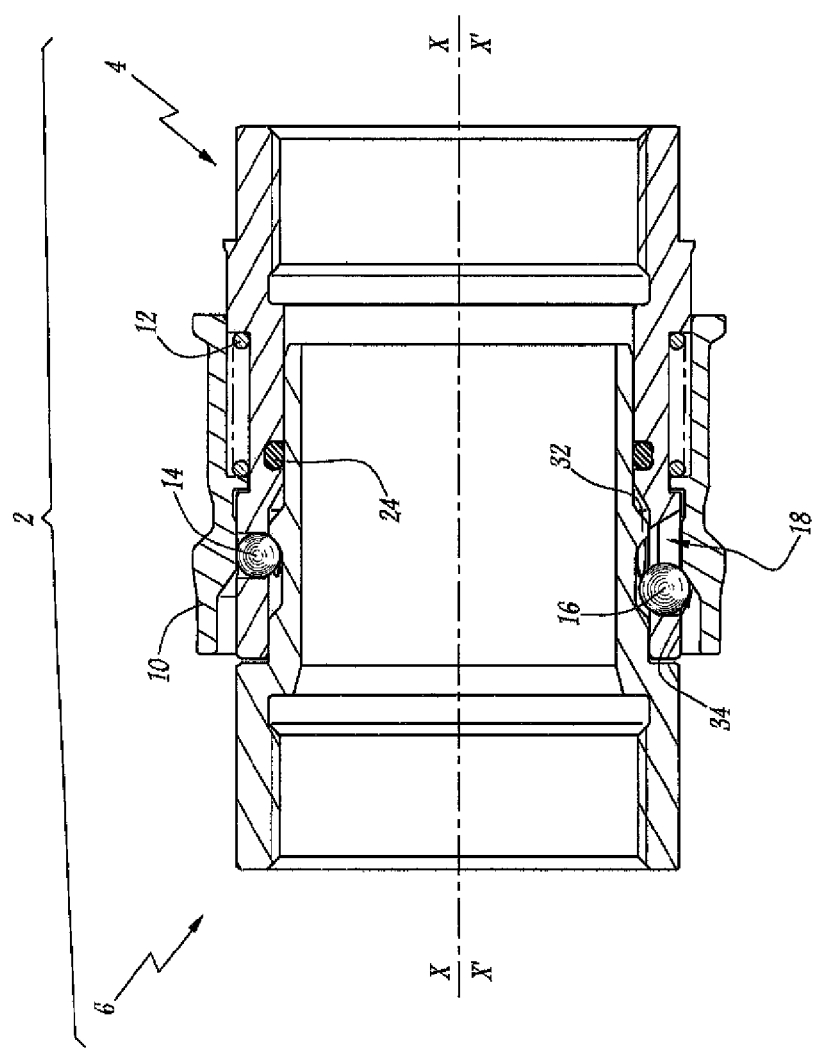
FIG. 7 shows a view similar to that of FIG. 1, the assembly being in the coupled configuration, the locking member being in its locked position.

Simultaneously, or before the actuating ball 16 reaches the top 32B of the actuating collar 32, the top 32B axially pass the locking ball 14, and the locking ball is movable radially inwards into the groove 32C in a position of locking of the complementary coupling element 6 in the coupling element 4. The fact that the locking ball 14 is in contact with the top 32B in its unlocked position or radially opposite the groove 32C when the actuating ball 16 comes into contact with the top 32B ensures that the locking ring 10 cannot be pushed into a position where it could lock the actuating ball 16 into the groove 32C behind the actuating collar 32 and where the locking ball 14 would not be in the locking position in the groove 32C of the complementary coupling element 6. When the actuating ball enters into contact with the top 32B and the ball is facing the groove 32C, the lock ring 10 is pushed back under the action of the spring 12 into the locking position in which the covering surface 33 of the locking ring 10 comes to be radially covering the locking balls in the groove 32C of the complementary coupling element 6 (FIG. 7). In its forward movement, the locking ring 10 pushes, in the groove 32C and in the elongated housing 18, the actuating ball 16 that comes into abutment against the front end 22. The operator releases his action on the coupling element 6. The coupled state is reached.

Throughout the coupling phase, the locking ball 14 has no effect on the return stroke of the locking ring.

The progression of the actuating ball 16 in the elongated housing 18, while first of all axial and then radial, pushes the locking ring 10 from its locking position (FIG. 2) to a rear position (FIG. 5) beyond the release position and the contact position (FIG. 4).

The coupling is automatic in the sense that the sole action of fitting of the complementary coupling element 6 into the fluid coupling element 4 by the operator results in the coupling of the two coupling elements 4, 6. The locking ring does not have to be moved by any complementary action.

In the coupled position, the locking ring 10 is pushed into abutment against the actuating ball 16 that does not come into contact with the complementary coupling element 6. Thus the position of the locking ring 10 in the coupled state is axially identical to its position in the uncoupled state of the coupling assembly. These two positions correspond to a position of locking of the locking members 14 in their locked position.

Figure 8:
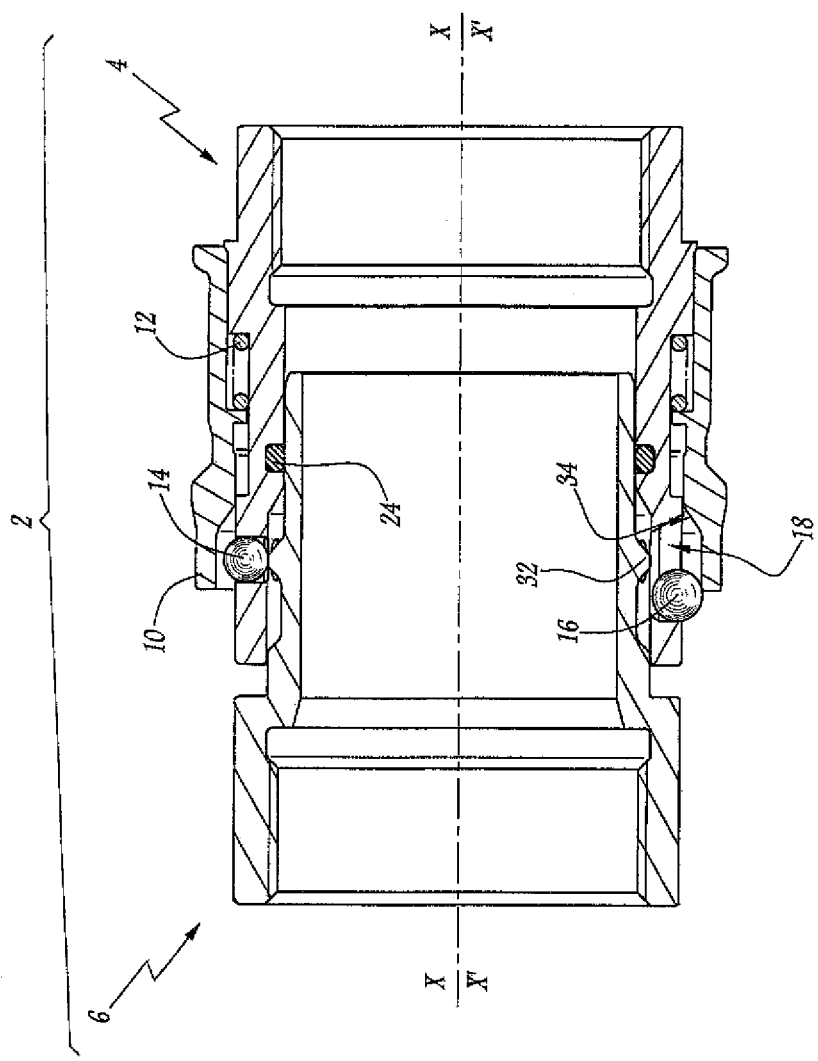
FIG. 8 shows a view similar to that of FIG. 1, during the uncoupling.

The uncoupling is carried out in the following manner. The locking ring 10 is moved towards the rear of the coupling element 4 up to a stop, beyond the release position and maintained in this position by the operator. This frees a radial clearance space for the locking ring 10 for the locking ball 14 and for the actuating ball 16 (FIG. 8).

The operator withdraws in the direction of uncoupling SD the complementary coupling element 6 of which the collar 32 pushes radially outwards, the locking balls into their unlocked position and the actuating balls and separates the two coupling elements.

The characteristic features of the invention provide the following advantages.

The difference in diameters between the actuating balls and the locking balls increases, in comparison to the state of the art, the engagement of each actuating ball between the coupling element 6 and the locking ring 10 to the equivalent geometry of the base body while the inner surface of the locking ring 10, including the covering surface 33, the slope of actuation 34 and forming the radial clearance space for the balls, and the outer surface of the body 8, on which is provided the elongated housing 18, remain of simple construction because of the revolution, without complementary fittings.

The difference in diameters also ensures more radial clearance for the locking balls relative to the locking ring when the complementary coupling element 6 comes into contact with the locking balls 14, which ensures that the locking balls 14 have no effect on the return stroke of the locking ring 10 at the time of coupling and that the coupling forces are minimal.

The difference in inclination or in the angle between the slope of actuation 32A of the actuating collar 32 of the complementary coupling element 6 (angle $\alpha$) and the slope of actuation 34 of the locking ring 10 (angle $\beta$) ensures that the actuating ball or the actuating member 16 remains in engagement between the complementary coupling element 6 and the locking ring 10, without escaping radially outwards in the movement of the actuating ball 16 in the elongated housing 18 up to its coming into contact with the rear end 22 during the coupling. Preferably, the difference in angle is greater than 0° and less than 10° and is in particular equal to 5°. It is necessary that the angle $\alpha$ be greater than or equal to the angle $\beta$.

The fact that in the uncoupled position, the locking ring 10 is pushed over the front in abutment against the ball or the actuating member 16 results in the control over the positional placement of the contacts of the actuating member 16 with the locking ring 10 and with the complementary coupling element 6 right from the beginning of the coupling.

The slope of the rear end 20 of the housing 18 at an angle γ makes it possible to drive the actuating ball 16 under very little axial coupling force. The angle γ is preferably equal to 120°, but may be between 105° and 130°.

The fact that the diameter DE of the sealing surface 28 of the complementary coupling element 6 is less than the minimum enveloping inner surface diameter on which are disposed the actuating balls and the minimum enveloping inner diameter on which are disposed the locking balls, helps maintain the sealing surface 28 of the contacts with the actuating balls and locking balls at the time of the coupling and uncoupling.

According to the invention, at least three actuating members are provided, arranged uniformly about the axis X-X (every 120°) in order to distribute the force exerted on the locking ring in the coupling, to limit embrittlement of the base body 8 and to accommodate a large number of locking balls (in this case 18 locking balls in the embodiment presented).

By way of a variant not shown, the coupling assembly includes an complementary coupling element 6 and/or a coupling element 4 provided with a valve.

The invention claimed is:

1. A fluid coupling element comprising
a base body defining an open passage having a central axis, the open passage having a configuration to cooperatively receive a complementary fluid coupling element,
at least one locking ball radially movable in a locking ball housing of the base body between a radial locking position wherein the at least one locking ball is adapted to lock the complementary fluid coupling element with respect to the base body when the complementary fluid coupling element is inserted within the base body, and a radial unlocking position wherein the at least one locking ball frees the open passage for the complementary fluid coupling element in the base body,
a locking ring axially movable relative to the base body between a locking position wherein the locking ring radially locks the at least one locking ball in the radial locking position and a release position in which the at least one locking ball has sufficient radial clearance with the locking ring in order to be movable in the radial unlocking position, return means for returning the locking ring to the locking position,
at least one actuating ball of the locking ring having a diameter (D) greater than a diameter (d) of the at least one locking ball and being movable in an elongated housing of the base body, the elongated housing having a front end which is disposed axially forward relative to the locking ball housing and a rear end which is disposed axially rearward relative to the locking ball housing, the at least one actuating ball being adapted to be pushed in the elongated housing and brought into contact with the rear end of the elongated housing by the complementary fluid coupling element during coupling of the base body and the complementary fluid coupling element so as to drive the locking ring axially from the locking position at least into the release position.

2. The coupling element according to claim 1, wherein the diameter (D) of the at least one actuating ball is between 105% and 125% of the diameter (d) of the at least one locking ball.

3. The coupling element according to claim 1, wherein when the locking ring is in the locking position, the at least one actuating ball protrudes from the base body radially from opposite sides by a substantially identical distance.

4. The coupling element according to claim 1, wherein the rear end of the elongated housing has a slope forming an angle (γ) of between 105° and 130° relative to the central axis (X-X).

5. The coupling element according to claim 1, wherein, during coupling of the complementary fluid coupling element with the base body, a forward most position of the locking ring wherein the at least one locking ball is free to move radially in the unlocking position is located axially between the locking position and a position of the locking ring, wherein the at least one actuating ball enters into contact with the rear end of the elongated housing.

6. The coupling element according to claim 1, wherein, when the locking ring is in the locking position and the of the complementary fluid coupling element is not coupled within the base body, the locking ring is pushed against the at least one actuating ball and the at least one actuating ball is in contact with the front end of the elongated housing.

7. The coupling element according to claim 1, wherein an outer surface of the base body on which the elongated housing is arranged is a surface of revolution about the central axis (X-X) and in that an inner surface of the locking ring is a surface of revolution about the central axis (X-X).

8. The coupling element according to claim 1, wherein the fluid coupling element includes at least three actuating balls.

9. A fluid coupling assembly comprising a combination of fluid coupling element and an complementary fluid coupling element, wherein the fluid coupling element is an element according to claim 1.

10. The fluid coupling assembly as claimed in claim 9, wherein the complementary fluid coupling element includes an actuating collar for actuation of the at least one actuating ball for moving the locking ring from the locking position to at least the release position during coupling of the fluid coupling element and the complementary fluid coupling element and a groove adapted to receive the at least one locking ball in the radial locking position when the complementary fluid coupling element is coupled within the base body.

11. The fluid coupling assembly as claimed in claim 10, wherein the collar has a first slope of actuation inclined at an first angle (α) relative to the central axis, and in that the locking ring has a second slope of actuation, the second slope of actuation being inclined at a second angle (β) relative to the central axis, and in that the at least one actuating ball is engaged between the first slope of actuation of the complementary coupling element and the second slope of actuation of the locking ring for the displacement of the locking ring from the locking position to at least the release position during coupling of the complementary fluid coupling element within the base body and in that the first angle (α) is greater than the second angle (β).

12. The fluid coupling according to claim 10, wherein, during coupling, when the at least one actuating ball enters into contact with a top of the collar, the at least one locking ball is in contact with a top and radially facing the groove.

13. The fluid coupling assembly according to claim 9, wherein, during coupling of the complementary fluid coupling element within the base body, when the at least one actuating ball enters into contact with a rear end of the elongated housing, the at least one locking ball projects radially over an exterior of the base body.

14. The fluid coupling assembly according to claim 9, wherein the fluid coupling element includes a sealing gasket and the complementary fluid coupling includes a sealing surface adapted to cooperate with the sealing gasket when the complementary fluid coupling element within the base body, in that the at least one locking ball and/or actuating ball occupies a radially innermost position, and in that in said radially innermost position, the at least one locking ball and/or actuating ball is situated radially away from an exterior diameter (DE) of the sealing surface.

15. The fluid coupling assembly as claimed in claim 9, wherein, in the locking position of the at least one locking ball in the radial locking position with the complementary fluid coupling element within the base body, the locking ring is resiliently pressed against the at least one actuating ball and in that the at least one actuating ball is not in contact with the complementary fluid coupling element.

\* \* \* \* \*